(12) United States Patent
Reisige et al.

(10) Patent No.: US 12,344,349 B2
(45) Date of Patent: Jul. 1, 2025

(54) METHOD FOR CHANGING A TRANSMISSION RATIO OF A GEARING OF A BICYCLE, COMPUTER PROGRAM, CONTROLLER, DRIVE UNIT, AND BICYCLE

(71) Applicant: Robert Bosch GmbH, Stuttgart (DE)

(72) Inventors: Christian Reisige, Tuebingen (DE); Marcus Boege, Dusslingen (DE); Thomas Mattes, Eningen Unter Achalm (DE); Merlin Martin Manewald, Reutlingen (DE); Daniel Baumgaertner, Neustetten (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/556,724

(22) PCT Filed: Apr. 8, 2022

(86) PCT No.: PCT/EP2022/059415
§ 371 (c)(1),
(2) Date: Oct. 23, 2023

(87) PCT Pub. No.: WO2022/228867
PCT Pub. Date: Nov. 3, 2022

(65) Prior Publication Data
US 2024/0199170 A1    Jun. 20, 2024

(30) Foreign Application Priority Data
Apr. 30, 2021    (DE) ...................... 10 2021 204 352.6

(51) Int. Cl.
*B62M 25/08*    (2006.01)
*B62J 45/411*    (2020.01)
(Continued)

(52) U.S. Cl.
CPC ............ *B62M 25/08* (2013.01); *B62J 45/411* (2020.02); *B62J 45/413* (2020.02); *B62J 45/414* (2020.02); *B62J 45/4151* (2020.02)

(58) Field of Classification Search
CPC ........ B62M 25/08; B62M 6/45; B62M 9/122; B62M 2025/006; B62J 45/411;
(Continued)

(56) References Cited

U.S. PATENT DOCUMENTS

2013/0054067 A1    2/2013  Shoge et al.
2013/0090819 A1    4/2013  Cheng
(Continued)

FOREIGN PATENT DOCUMENTS

DE    10 2009 011 882 A1    3/2011
DE    10 2014 015 630 A1    4/2015
(Continued)

OTHER PUBLICATIONS

International Search Report corresponding to PCT Application No. PCT/EP2022/059415, mailed Aug. 12, 2022 (German and English language document) (6 pages).

*Primary Examiner* — Lori Wu
(74) *Attorney, Agent, or Firm* — Maginot, Moore & Beck LLP (57) ABSTRACT

A method for changing a transmission ratio of an electrically controllable gearing of a bicycle, in particular of an electric bicycle, includes (i) measuring a pedaling frequency of the bicycle rider on the pedal shaft, (ii) measuring a pedaling force of the bicycle rider, and (iii) determining a gear change operating state on the basis of the measured pedaling frequency and on the basis of the measured pedaling force if the measured pedaling frequency is less than or equal to a lower frequency threshold value or is greater than or equal to an upper frequency threshold value, and/or the measured ped- (Continued)

aling force is less than or equal to a lower force threshold value or is greater than or equal to an upper force threshold value. After determining the gear change operating state, a control signal is generated for the gearing according to the determined gear change operating state.

16 Claims, 5 Drawing Sheets

(51) Int. Cl.
*B62J 45/413* (2020.01)
*B62J 45/414* (2020.01)
*B62J 45/415* (2020.01)

(58) Field of Classification Search
CPC .... B62J 45/413; B62J 45/414; B62J 45/4151; B62J 45/421; B62J 50/22
See application file for complete search history.

(56) References Cited

U.S. PATENT DOCUMENTS

| | | | | |
|---|---|---|---|---|
| 2015/0307157 | A1* | 10/2015 | Gao | B62M 6/45 |
| | | | | 701/52 |
| 2017/0334514 | A1* | 11/2017 | Chen | B62M 6/55 |
| 2018/0111661 | A1* | 4/2018 | Wesling | B62M 9/122 |
| 2019/0309841 | A1* | 10/2019 | Shahana | B62J 45/412 |
| 2020/0115006 | A1* | 4/2020 | Shahana | B62M 9/123 |

FOREIGN PATENT DOCUMENTS

| | | |
|---|---|---|
| DE | 10 2019 108 144 A1 | 10/2019 |
| EP | 2 983 975 B1 | 1/2019 |
| TW | I 641526 B | 11/2018 |

* cited by examiner

METHOD FOR CHANGING A TRANSMISSION RATIO OF A GEARING OF A BICYCLE, COMPUTER PROGRAM, CONTROLLER, DRIVE UNIT, AND BICYCLE

This application is a 35 U.S.C. § 371 National Stage Application of PCT/EP2022/059415, filed on Apr. 8, 2022, which claims the benefit of priority to Serial No. DE 10 2021 204 352.6, filed on Apr. 30, 2021 in Germany, the disclosures of which are incorporated herein by reference in their entirety.

The present disclosure relates to a method for changing a transmission ratio of a gearing of a bicycle—in particular of an electric bicycle. Furthermore, the disclosure relates to a computer program comprising commands that, when the program is executed by a computer, prompt the computer to perform the method steps according to the disclosure. The disclosure further relates to a controller having a processor configured to perform the steps of the method and a drive unit for an electric bicycle having a drive motor and the controller. Furthermore, the disclosure relates to a bicycle having the controller or drive unit.

BACKGROUND

Document EP 2 983 975 B1 discloses a shifting of a gearing even during non-pedaling by a rider. An electric drive is used to move a chain so that smooth shifting is possible.

Document DE 10 2009 011 882 A1 discloses an electronic control of system parts, with which automatic insertion and shifting of the gears of a gearing for muscle-powered vehicles can be effected as a function of the introduced bodily force according to individual requirements.

Document DE 10 2014 015 630 A1 discloses a bicycle control apparatus. A controller controls at least one of either the drive unit or the electrical shift unit so that a crank torque and a crank speed are within a predetermined range. If the rotational parameter is less than the predetermined range, the controller can control the electric shift unit such that the transmission ratio is/will be small so that it becomes easy to bring the rotational parameter into the predetermined range. If the rotational parameter is greater than the predetermined range, the controller can control the electric shift unit such that the transmission ratio becomes/is large. If the muscle drive force is greater than the predetermined range, the controller can increase an auxiliary drive force.

Currently, commercially available automatic gearings for bicycles are operated in a manner that, with knowledge of the transmission ratios of various gears, the rider cadence is brought as close as possible to a specified target cadence: If there is a different gear whose transmission ratio indicates a rider cadence closer to the target cadence than the current cadence, that gear is shifted to. Finely-stepped gearings typically result in many shifts, since a more appropriate gear is often available, This can be perceived as disruptive by the rider. Even with fast cadence changes, no gears are skipped, but all gears are successively shifted.

Moreover, for power-assisted electric bicycles, a problem arises when the motor torque of the drive motor has already reached the maximum amount, or an operating state exists with a non-linear relationship between the rider torque and the motor torque. It can then happen that, after an automatic shift to a greater transmission ratio, a lower or more advantageous cadence in fact results for the bicycle rider, but also undesirably high rider torque required to maintain the current speed, because the increased overall torque in the higher gear due to the gear shift must thus be fully applied by the rider. For example, the electric bicycle can become undesirably slower at large slopes or at high speeds due to this fact, despite a shift to a higher gear.

The present disclosure has the object of improving a semi-automatic or automatic shifting or adjustment of a transmission ratio of a gearing of a bicycle.

SUMMARY

The above object is achieved according to the disclosure by way of the method, the computer program, the controller, the drive unit, and the bicycle set forth below.

The present disclosure relates to a method for shifting a transmission ratio of an electrically controllable gearing of a bicycle. The method according to the disclosure comprises a measurement of a pedaling frequency or a cadence of the bicycle rider at the pedal shaft, whereby, for example, a rotational speed of the pedal shaft and/or a rotational speed of a rotor of a power-assisting drive motor of the bicycle represents the pedaling frequency. The measurement of the pedaling frequency is performed in particular by means of a rotational speed sensor, in particular by means of a rotational speed sensor on the pedal shaft or by means of at least one rotor position sensor in the drive motor. Furthermore, in the method, a pedaling force of the bicycle rider is measured, whereby, advantageously, the rider torque at the pedal shaft is measured, which represents the pedaling force. Preferably, the pedaling force of the bicycle rider is measured by means of a torque sensor on the pedal shaft of the bicycle. Alternatively, the pedaling force can be measured, for example, by means of a force sensor on at least one of the pedals. Then, a gear change operating state is determined. The determination of the gear change operating state is made on the basis of the measured pedaling frequency and/or on the basis of the measured pedaling force. The gear change operating state is determined when the measured pedaling frequency is less than or equal to a lower frequency threshold value, or when the measured pedaling frequency is greater than or equal to a higher frequency threshold value. Alternatively or additionally, the gear change operating state is determined when the measured pedaling force is less than or equal to a lower force threshold value, or when the measured pedaling force is greater than or equal to an upper force threshold value. In other words, to determine the gear change operating state, it is determined or checked whether the measured pedaling frequency and/or the measured pedaling force is or are within a respective target range. These respective target ranges are advantageously defined by the lower frequency threshold value and the upper frequency threshold value and/or the lower force threshold value and the upper force threshold value. In turn, in other words, determining the gear change operating state advantageously represents a comparison of the measured pedaling frequency and/or the measured pedaling force of the bicycle rider with respective associated target ranges, whereby a gear change operating state is determined when the measured pedaling frequency and/or the measured pedaling force is outside of the respective associated target range or departs from the respective associated target range. The respective target ranges for the measured pedaling frequency and/or the measured pedaling force can advantageously be visualized in combination—for example, two-dimensionally; in this regard, see also the exemplary embodiments listed below. After determining the gear change operating state, preferably a shift command for the gearing is determined. In other words, in particular, the change in a transmission ratio of the gearing is advantageously not initially performed immediately, despite a determined departure from the respective target range for the measured pedaling frequency and/or the measured pedaling force. Advantageously, further operating conditions of the bicycle for determining the shift command to change a gear are checked, and/or a shift period waited for, and/or an ideal transmission ratio is determined. Then, a control signal for the gearing is generated on the basis of the determined gear change operating state and advantageously on the basis of the particular shift command. In an optional step, the transmission ratio of the gearing is adjusted on the basis of the generated control signal. The method results in particular in the advantage that deviations or outliers of the pedaling frequency and/or the pedaling force from target ranges of an automatic gearing do not directly result in a control signal for the gearing or in a shift of the transmission ratio; instead, the adjustment of the transmission ratio is in particular delayed in time and advantageously avoided-in particular, if a shift in a travel situation is deemed undesirable during the determination of the shift command. The absolute number of shift operations of the gearing or changes in transmission ratios is thus advantageously reduced, thereby providing a more comfortable ride feel—particularly when the gearing has many discrete gears or transmission ratios. In addition, for the rider, the number of shifts to an improper gear is advantageously reduced compared to alternative known shifting methods, so that a more comfortable handling of the bicycle usually results for the bicycle rider.

In a particularly preferred embodiment, the determination of the shift command is performed on the basis of an expiration of a shift period after the determination of the gear change operating state. In this embodiment, the determination of the shift command is advantageously made only if the conditions for determining the gear change operating state are still met. Thus, advantageously, in the event of a short-term and/or minimal deviation of the measured pedaling frequency and/or the measured pedaling force from the target range, a control signal for the gearing is not generated. This advantageously efficiently and simply reduces the absolute number of shift operations of the gearing or changes in the transmission ratio. It can be provided that the shift period be adjusted on the basis of the measured pedaling frequency and/or the measured pedaling force; for example, the shift period decreases linearly with the distance of the measured pedaling frequency from the lower or upper frequency threshold value.

In a preferred embodiment, the shift command is ascertained or determined on the basis of the measured pedaling frequency and/or on the basis of the measured pedaling force. Advantageously, at low or high pedaling frequencies and/or high pedaling forces, a shift signal can be generated immediately or the transmission ratio adjusted. Advantageously, the shift command is determined on the basis of a time change or mathematical derivation of the measured pedaling frequency and/or on the basis of a time change or mathematical derivation of the measured pedaling force. Additionally, or alternatively, in this embodiment, advantageously, in the case of a positive derivation above a threshold value for changing the pedaling frequency and/or in the case of a positive derivation of the measured pedaling force above a threshold value for changing the pedaling force, a shift signal is generated or the transmission ratio adjusted. However, in this embodiment, preferably no shift command is determined if the change in the measured pedaling frequency within the shift period after the determination of the gear change operating state is negative if the upper frequency threshold value is exceeded, or if the change in the measured pedaling frequency is positive if the lower frequency threshold value is exceeded within the shift period after the determination of the gear change operating state. In this embodiment, the current riding situation or operating situation is taken into account when determining the shift command, so that a semi-automatic or automatic shifting of the gearing for the bicycle rider, which is coordinated with the riding situation and is very comfortable, results.

In a further embodiment of the disclosure, a speed of the bicycle is measured. The measurement of the speed is performed, for example, by means of a speed sensor on the bicycle—for example, by means of a reed sensor or a rotational speed sensor on one of the wheels of the bicycle. Alternatively or additionally, an acceleration of the bicycle is measured, for example, by means of an accelerometer, and/or the acceleration is determined on the basis of the measured speed of the bicycle. Alternatively or additionally, a slope of the travel distance of the bicycle or a pitch angle of the bicycle about its transverse axis is measured—for example, by means of an inertial measuring unit. A shift command is then determined or ascertained on the basis of the measured speed of the bicycle, on the basis of the measured or determined acceleration and/or slope, whereby in particular, the shift command is determined on the basis of at least a time change in the measured speed, the measured or determined acceleration, and/or the measured slope. This results in the advantage that, for example, if the pedaling frequency exceeds the upper frequency threshold value, a control signal for the gearing is generated only if, simultaneously, the time change in the slope of the travel path is not positive or becomes more positive, such that, for example, when riding on an increasingly steeper slope of a travel path, no immediate undesirable shift into a higher gear is performed. Furthermore, in this embodiment, an adjustment of the transmission ratio can advantageously be prevented with increasing or consistent speed when the bicycle is coasted downhill on a slope of the travel path. In other words, in this embodiment, although the pedaling frequency is below the lower frequency threshold value or exceeds the upper frequency threshold value, and/or the pedaling force exceeds the upper force threshold value, it is advantageous in some riding situations to not generate a control signal for the gearing, because a shift to a lower transmission ratio is deemed undesirable in these riding situations.

Preferably, upon determining the gear change operating state, an ideal transmission ratio is furthermore determined on the basis of the measured pedaling frequency and/or on the basis of the measured pedaling force and/or on the basis of the measured speed of the bicycle and/or on the basis of the measured or determined acceleration of the bicycle and/or on the basis of the measured slope of the travel path. The gearing between the current transmission ratio and the ideal transmission ratio in this case features at least one skipped transmission ratio of the gearing. In this embodiment, it can be provided that, additionally, the current transmission ratio be measured or determined. Then, the control signal for the gearing is additionally generated on the basis of the determined ideal transmission ratio, whereby at least one transmission ratio of the gearing is skipped when adjusting the transmission ratio of the gearing. This design is particularly advantageous if, in case of a positive or negative change in a slope of the travel path, changing to a very different transmission ratio is to take place, whereby it is undesirable to successively shift through multiple transmission ratios, because each shift results in an abrupt change in rider torque, and, in the case of an electric bicycle, also in an abrupt change in the motor torque. In addition, a short, undesirable interruption of the power flow to the rear wheel of the bicycle also usually results—for example, when changing a chain of a derailleur gear to another transmission ratio.

Preferably, it is provided that, upon determining the gear change operating state, acoustic, visual, and/or haptic information regarding the semi-automatic or predicted automatic shift is displayed to the bicycle rider. The bicycle rider is thereby informed of the process and can, for example, cancel the expected automatic behavior by a further input if the riding situation, e.g., an impending slope of the travel path or an impending descent, makes this necessary. This embodiment of the method results in a comfortable riding feel and a controllable or easily adjustable, balanced process for the bicycle rider.

In a further execution of the method, the transmission control signal for the gearing is not generated until, after the particular shift command, the measured pedaling frequency of the bicycle rider is less than an activation frequency threshold value and/or until, after the particular shift command, the measured pedaling force of the bicycle rider is less than an activation force threshold value. In other words, the generation of the control signal for the gearing is additionally performed on the basis of a confirmation of the bicycle rider, whereby the bicycle rider confirms the shift of the gear, in particular, by a pedaling force and/or pedaling frequency interruption. In other words, in this embodiment, the bicycle rider confirms the control command by adjusting the pedaling frequency and/or the pedaling force. In particular, the generation of the control signal for the gearing occurs only when the measured pedaling frequency of the bicycle rider is zero or near zero. Alternatively or additionally, the bicycle rider's confirmation is measured by means of an input means, whereby the input means for confirming the shift is preferably arranged near one of the handle grips. In this embodiment, after determining the shift command, the bicycle rider is in particular given acoustic, visual, and/or haptic shift information about the semi-automatic shift, preferably by means of an HMI, whereby the shift information in particular represents a request to confirm the adjustment of the transmission ratio or a gear change. These semi-automatic shifting embodiments result in convenient, semi-automatic generation of the control signal for the gearing.

In one embodiment, it is provided that a determination of an expected future rider torque and/or an expected pedaling frequency be made for the future transmission ratio, such as the ideal transmission ratio, prior to adjusting the transmission ratio. The determination of the expected future rider torque and/or the expected pedaling frequency is made on the basis of the measured current pedaling force of the bicycle rider and/or the measured current pedaling frequency, and on the basis of the current motor power of a drive motor of an electric bicycle, and on the basis of the current transmission ratio and a predicted or future transmission ratio. The predicted transmission ratio can be determined on the basis of the measured pedaling frequency and/or on the basis of the measured pedaling force as well as a particular target range for the pedaling frequency and/or the pedaling force or on the basis of the frequency threshold values and/or the force threshold values. Then, in this embodiment, the shift command is additionally determined on the basis of the expected rider torque and/or the expected pedaling frequency; in particular, the shift command is only determined if the expected rider torque is between the lower and upper force threshold value and/or the expected pedaling frequency is between the lower and upper frequency threshold value. This embodiment advantageously takes into account the current and future motor torque of a drive of an electric bicycle, which results in a more comfortable shift behavior—for example, in riding situations of the electric bicycle in which the motor torque of the drive motor is saturated.

In another particularly preferred embodiment, the method includes determining a predicted future motor torque and/or a predicted future motor power of a drive motor of an electric bicycle to a possible change in the transmission ratio on the basis of the measured pedaling force and/or the measured pedaling frequency, on the basis of the current motor torque of the drive motor, and on the basis of the current transmission ratio and a predicted transmission ratio. The predicted transmission ratio can be determined on the basis of the measured pedaling frequency and/or on the basis of the measured pedaling force and of a particular target range for the pedaling frequency and/or the pedaling force or the frequency threshold values and/or the force threshold values. Then, the determination of the shift command is made additionally on the basis of the determined future motor torque and/or predicted future motor power. In this embodiment, in particular, a determination of the shift command and a change in the transmission ratio is suppressed or avoided if a significantly reduced predicted future motor power of the electric bicycle drive motor is determined in the future transmission ratio at the same rider power, despite adjusted pedaling frequency and adjusted pedaling force.

In an alternative embodiment, out-of-seat pedaling by the bicycle rider is detected on the basis of the measured pedaling frequency and/or the measured pedaling force of the bicycle rider and/or on the basis of a measured lateral acceleration of the bicycle in the transverse direction of the bicycle and/or a measured lateral inclination of the bicycle. Subsequently, a determination of the shift command is made additionally on the basis of the detected out-of-seat pedaling, whereby, in the case of detected out-of-seat pedaling, in particular no shift command is determined after the end of the shift period. In this alternative embodiment, a shifting of the gearing or a change in the transmission ratio with determined out-of-seat pedaling by the bicycle rider is preferably avoided, because shifting during out-of-seat pedaling is generally not desired.

In an advantageous alternative embodiment, a measurement of an input of the bicycle rider for setting a shift mode is performed. In other words, the bicycle rider advantageously adjusts a shift mode or shift behavior through the input. The input of the bicycle rider is measured, for example, by means of an input means on the handlebar of the bicycle or on an HMI. Then, in this embodiment, an adjustment of the lower frequency threshold value and/or the upper frequency threshold value is performed on the basis of the bicycle rider's measured input. Alternatively or additionally, the lower force threshold value and/or the upper force threshold value is adjusted on the basis of the bicycle rider's measured input. In other words, advantageously, the particular target range for the pedaling frequency and/or the pedaling force is adjusted on the basis of the measured input. Alternatively or additionally, it can be provided that the determination of the shift command on the basis of the bicycle rider's measured input be additionally performed, whereby, on the basis of the measured input of the bicycle rider, the shift period and/or respective threshold values for the speed of the bicycle, for the acceleration of the bicycle, for the pedaling force of the bicycle rider, for the slope of the travel path, and/or for the time change thereof are adjusted. Alternatively or additionally, the ideal transmission ratio is additionally determined on the basis of the measured input of the bicycle rider. This advantageous embodiment results in a more direct or more indirect shift behavior possibly desired by the bicycle rider in some riding situations and/or a setting of the shift behavior with regard to the skipping of gears or transmission ratios. In a particularly preferred embodiment of this design, in the case of an electric bicycle, the input for setting an assistance ratio additionally includes the input for setting the shift mode or the shift behavior, whereby in particular a shift mode is associated with each assistance ratio. In other words, the input for setting the shift mode can be coupled to the input for setting the assistance ratio. For example, the assistance ratio, "Eco" and/or "sport," is associated with a direct shift behavior by a small difference between the lower and upper frequency threshold values, and the assistance ratio, "turbo," is associated with an indirect shift behavior by a greater difference between the lower and upper frequency threshold values.

The disclosure also relates to a computer program comprising commands that, when the program is executed by a computer, cause the computer to perform the method steps according to one of the preceding claims. The computer program can preferably be loaded from a cloud, or from a server facility via a wireless or wired data link. Such a computer program enables, e.g., updates-over-the-air for controlling a gearing of a bicycle—in particular, of an electric bicycle—e.g., in the event of a retrofit or replacement of a gearing of the bicycle.

The disclosure also relates to a controller, the controller comprising at least one first signal input for providing a first signal representing the pedaling frequency of a bicycle rider. The controller also comprises a second signal input for providing a second signal representing the bicycle rider's pedaling force. The controller also comprises a signal output for outputting a control signal for an electrically controllable gearing of a bicycle. Furthermore, the controller has computing unit—in particular, a processor—configured to perform the method steps according to the disclosure. In other words, the controller is configured to perform the method according to the disclosure. With this controller, the advantages for the bicycle rider or the bicycle described in the method thus result.

The disclosure further relates to a drive unit for an electric bicycle having a drive motor, the drive unit comprising at least one rotational speed sensor. The rotational speed sensor is configured to measure a pedaling frequency of a bicycle rider on the pedal shaft of a bicycle. Furthermore, the drive unit comprises a pedaling force sensor, the pedaling force sensor being configured to measure a pedaling force of a bicycle rider on the pedal shaft of a bicycle. The drive unit also comprises the controller according to the disclosure. Optionally, the drive unit can comprise an electrically controllable gearing. Alternatively, the drive unit is configured by means of the controller to control an electrically controllable gearing of the bicycle by means of a generated control signal at the signal output.

The disclosure also relates to a bicycle, in particular an electric bicycle. The bicycle according to the disclosure comprises an electrically controllable gearing, as well as a controller according to the disclosure or a drive unit according to the disclosure.

BRIEF DESCRIPTION OF THE DRAWINGS

Further advantages arise from the following description of exemplary embodiments with reference to the drawings.

DETAILED DESCRIPTION

Figure 1:
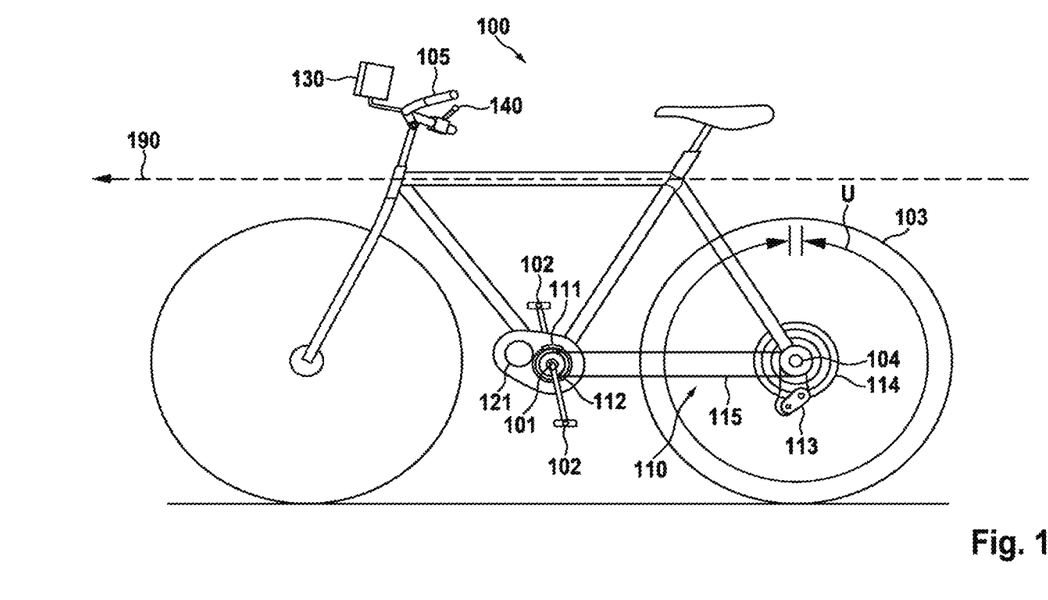
FIG. 1: a bicycle with an electrically controllable gearing

In FIG. 1, a bicycle 100 with an electrically controllable gearing 110 is shown schematically. The bicycle 100 comprises pedals 102 on a pedal shaft 101 for receiving pedaling forces F of the bicycle rider. The bicycle 100 has a longitudinal axis 190 and, in operation, typically travels in the direction of travel towards the longitudinal axis, driven by a pedaling force F of the bicycle rider with a pedaling frequency K on the pedals or a rider torque on the pedal shaft 101. For example, at a transmission ratio of i=2 between the pedal shaft 101 and the rear wheel hub 104 of the rear wheel 104 and the rear wheel 103, the rear wheel 103 of a bicycle 100, for example, rotates at the double rotational speed in operation compared to the bicycle rider's pedaling frequency K at the pedal shaft 101. The bicycle 100 also optionally comprises a display device 130 or an HMI and/or an input means 140, whereby the display device 130 and the input means 140 are preferably arranged on the handlebar 105 of the bicycle 100. In this exemplary embodiment, the electrically controllable gearing 110 of the bicycle 100 is a derailleur gear comprising an electrically controllable front derailleur 111 and chain rings 112 at the pedal shaft 101 and an electrically controllable jockey roller 113 and a sprocket packet 114 or pinion packet at the rear wheel hub 104 of the rear wheel 103, whereby the chain rings and the sprocket packet 114 are connected to one another by means of a chain 115. Alternatively, other types of electrically controllable gearings can be arranged on the bicycle 100, e.g., an electrically controllable hub shift on the rear wheel hub 104 of the rear wheel 103—for example, comprising a multistage planetary gear train. Chain and hub shifts of bicycles usually have discrete transmission ratios i, whereby the stepping of gears or transmission ratios i depends upon the type of gearing and the manufacturer. For example, the transmission ratio of a derailleur gear or gearing 110 having a 53/39 chain ring combination on the pedal shaft 101 or crankshaft and having a pinion packet with 11 to 21 teeth on the rear wheel hub 104 in discrete steps is between 1.86 to 4.82. Hub shifts with 3 or 8 gears typically have a transmission ratio range similar to the described derailleur gear. The shiftable range of the transmission ratio of an alternative, continuously variable gearing 110, which is arranged on, for example, the rear wheel hub 104 of the bicycle 100, is typically comparable to chain and hub shifts with planetary gear trains. A transmission ratio of a gearing 110 of a bicycle 100 is thus typically between approximately 1.5 and 5. Advantageously, both the rider torque FM and the motor torque M are combined prior to the gearing 110 and via the gearing 110 translated by a transmission ratio i transmitted to the rear wheel hub 104 of the rear wheel 103 of the bicycle 100. The gearing 110 can be designed to be electrically controllable in all configurations or types.

The speed v of a bicycle 100 can generally be determined as a product of the transmission ratio i of the gearing 110, the pedaling frequency K, and the outer wheel circumference U of the drive wheel or rear wheel 103; see also Equation (1). This applies as long as the bicycle 100 is actively ridden by the bicycle rider without motor assistance, i.e., there is also no idling or braking. For example, the pedaling of a bicycle rider at a transmission ratio of i=2 with a pedaling frequency of K=80 rpm and an outer wheel circumference U=ca. 2.1 m (28" tires) achieves a speed v=ca. 20 km/h.

$$v \cdot = \cdot K \cdot i \cdot U \qquad (1)$$

For example, to reduce rider torque FM on a slope on a travel path, the bicycle rider shifts to a lower transmission ratio i of a gearing 110 while simultaneously increasing the pedaling frequency K. Given that braking is typically not done while shifting, the speed v of the bicycle remains approximately the same (v1=v2) at the time point of or before and during shifting of the transmission ratio. The pedaling frequency K thus changes discretely or abruptly by the shifting on the basis of the transmission ratio i approximately according to Equation (2).

$$v_2 = v_1 \Longrightarrow | K_2 = K_1 \cdot \frac{i_1}{i_2} \qquad (2)$$

The pedal power P of a bicycle rider can be described as a product of the pedaling frequency K and the pedal torque or the rider torque FM of the bicycle rider; see Equation (3).

$$P = FM * K \qquad (3)$$

The rider power P or the pedaling power of the bicycle rider can be assumed to be approximately consistent at the time of the adjustment or shifting of a transmission ratio from i1 to i2. Given consistent rider power P at the time of shifting, the rider torque FM2 is dependent upon the transmission ratios i1 and i2 as well as the rider torque FM1 according to Equation (4). Thus, the rider torque FM also changes discretely or abruptly on the basis of the transmission ratios i1 and i2 according to Equation (4) by the shifting of the transmission ratio of the gearing 110.

$$FM2 = FM1 \cdot \frac{i_2}{i_1} \qquad (4)$$

These described volatile changes in pedaling frequency and rider torque are desired, since shifting the gearing 110 is accomplished in a running adjustment of pedaling frequency and rider torque to respective target values. In other words, operating a bicycle 100 in the range of a desired pedaling frequency and desired rider torque is pleasant and comfortable for the bicycle rider. Again, in other words, operating a bicycle 100 outside of a particular target range for the pedaling frequency and/or for the rider torque, or for the pedaling force, is unpleasant for the bicycle rider, such that the bicycle rider, at a current pedaling frequency and/or a current rider torque outside of the particular target range, tends to change or adjust the transmission ratio of the gearing 110.

The bicycle 100 is further preferably an electric bicycle comprising a drive unit 120 having an electric drive motor 121 for driving the bicycle 100. The electric drive motor 121 is advantageously configured to generate a motor torque M on the basis of a measured pedaling force For a measured rider torque FM, whereby the motor torque M, in addition to the applied rider torque FM on the pedal shaft 101, is configured to drive the electric bicycle in the direction of travel. The motor torque M generated by means of the drive motor 121 is typically generated on the basis of the measured pedaling force For the measured rider torque FM at the pedal shaft 101, and on the basis of an assistance ratio a as per Equation (5) generally adjustable or selectable by the rider. For example, the assistance ratio a can be set between 100% and 400%.

$$M = \alpha * FM \qquad (5)$$

It can happen that the control of the drive motor 121 for generating the motor torque M deviates from Equation (5); in particular, there can be a non-linear relationship between the motor torque M and the measured rider torque FM, when shift operations of the gearing 110 are performed, in order to at least reduce jumps in motor torque such that, if the rider torque FM is changed abruptly, adjusting the transmission ratio will not result in a sudden change in the motor torque M.

Control of the drive motor 121 is also typically adjusted by a lockout prior to reaching a maximum speed vmax for motor assistance by the drive motor 121; for example, the maximum speed vmax=25 km/h for motor power assistance is legally required. In the range of the lockout or the maximum speed vmax, the generated motor torque M is preferably additionally generated or reduced on the basis of a measured speed v of the bicycle 100 and the maximum speed vmax.

Furthermore, during an uphill climb, there can be a slope of the travel path of the bicycle while in riding operation, in that from a measured rider torque FM the motor torque M goes into a saturation or is limited by a maximum motor torque Mmax, because the drive motor 121 cannot or is not intended to apply a motor torque M greater than the maximum motor torque Mmax, i.e., the motor torque M of the drive motor 121 is controlled or locked out on the basis of the maximum motor torque Mmax.

In the described riding situations, i.e., when shifting a gearing generally, at velocities v of the electric bicycle close to, equal to, or greater than the maximum speed vmax, and/or at a motor torque M equal to the maximum motor torque Mmax, non-intuitive effects result for the most suitable or most comfortable transmission ratio of a gearing for the bicycle rider. For example, the rider torque required in electric bicycles can become surprisingly large for maintaining or increasing a desired speed v of the electric bicycle if the rider torque required increases disproportionately after shifting to the greater transmission ratio due to a generated maximum motor torque Mmax prior to shifting and/or due to the lockout of the generated motor torque.

The pedaling frequency K of the bicycle rider is advantageously measured by a rotational speed sensor 210 on the pedal shaft 101. Alternatively or additionally, the pedaling frequency K in electric bicycles can be measured by means of rotor position sensors or by means of at least one rotor position sensor or a motor rotational speed sensor if a constant transmission ratio is present between the pedal shaft and the drive motor. Alternatively or additionally, the pedaling frequency K can be measured by means of a torque sensor 220 on the pedal shaft, whereby the pedaling frequency K is determined on the basis of the measured rider torque FM.

For example, the pedaling force F of the bicycle rider on the pedals or the rider torque of the bicycle rider on the pedal shaft can be measured by at least one force sensor on one of the pedals or by a torque sensor 220 on the pedal shaft 101 of the bicycle.

The speed v of the bicycle 100 is advantageously measured by a speed sensor 230, e.g., by a reed sensor on the rear wheel 103 of the bicycle 100.

Figure 2:
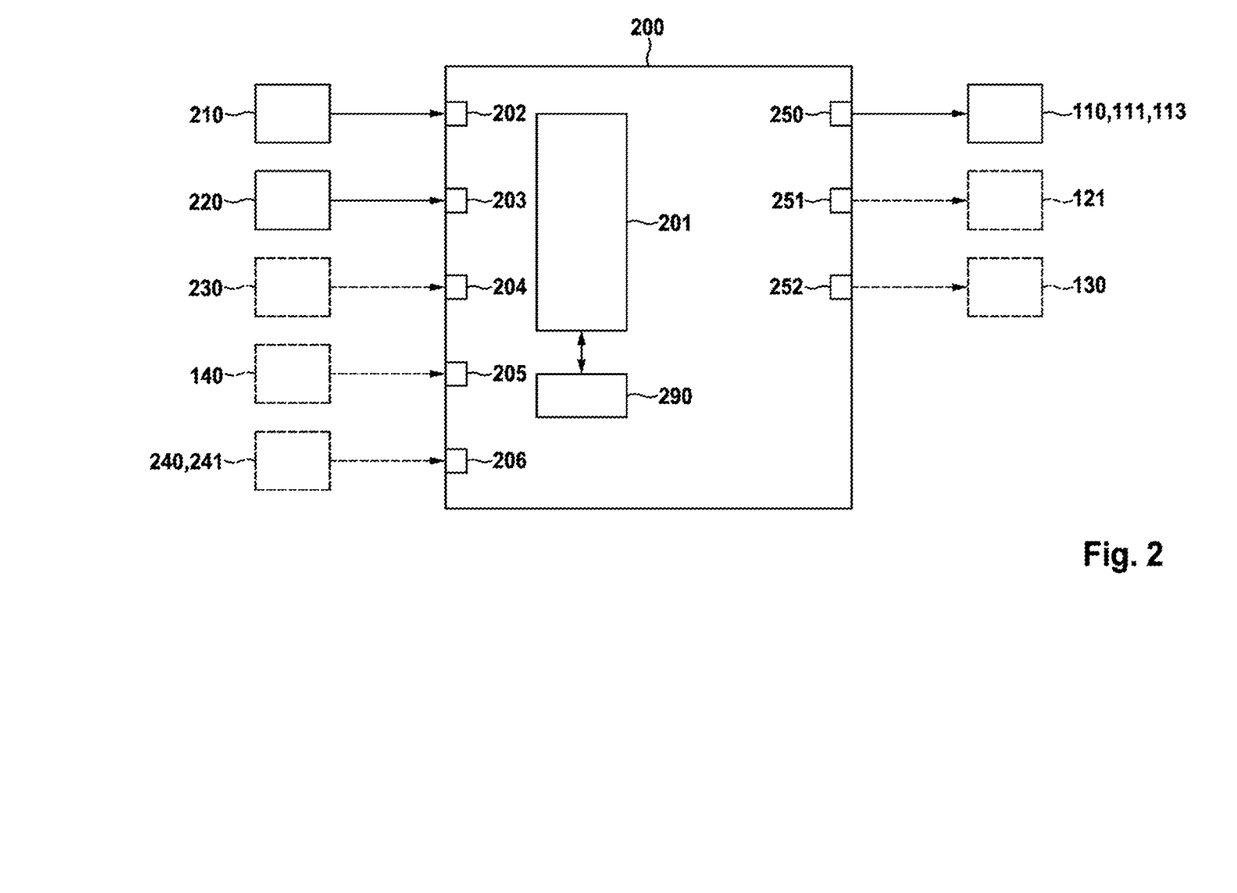
FIG. 2: a controller of a bicycle for controlling a gearing

In FIG. 2, a controller 200 of a bicycle 100 for controlling a gearing 110 is shown schematically. The controller 200 comprises a computing unit 201. The computing unit 201—in particular, a processor—is configured to perform the method steps according to the disclosure. The controller 200 further comprises an optional first signal input 202, a second signal input 203, an optional third signal input 204, an optional fourth signal input 205, and an optional fifth signal input 206. The controller 200 further comprises a signal output 250 for outputting a control signal for the electrically controllable gearing 110 of a bicycle 100. The second signal input 203 is configured to measure a second signal, e.g., the torque sensor 220 on the pedal shaft, representing the pedaling force of a bicycle rider. The optional first signal input 202 is configured to measure a first signal, e.g. the rotational speed sensor 210 on the pedal shaft, representing the pedaling frequency of a bicycle rider. It can be provided that the pedaling frequency of the bicycle rider be determined on the basis of the measured second signal or the measured pedaling force or the measured rider torque. The optional third signal input 204 is configured to measure a third signal from the speed sensor 230 representing the speed v of the bicycle 100. The optional fourth signal input 205 is configured to measure a fourth signal from the input means 140, which signal represents an input of the bicycle rider to the shift mode or the shift behavior. The optional fifth signal input 206 is configured to measure a fifth signal from an accelerometer 240 or an inertial measurement unit 241, the fifth signal representing an acceleration of the bicycle in the longitudinal direction, an acceleration of the bicycle in the transverse direction, a pitch angle of the bicycle, and/or a lateral slope of the bicycle, or a rotation of the bicycle 100 about the longitudinal axis 190 of the bicycle 100. The signal output 250 is configured to generate a control signal configured to control the electrically controllable gearing 110 for changing a transmission ratio. It can be optionally provided that controller 200 be configured, by means of a motor control signal output 251, to generate a motor control signal for the drive motor 121 of an electric bicycle as the bicycle 100. Optionally, it can further be provided that controller 200 be configured to generate a display signal for display device 130 of bicycle 100 by means of an indicator means signal output 252. Preferably, the controller comprises a memory 290, which advantageously stores, e.g., parameters such as the maximum speed vmax or the maximum motor torque Mmax, as well as a plurality of further operating parameters and threshold values.

Figure 3A:
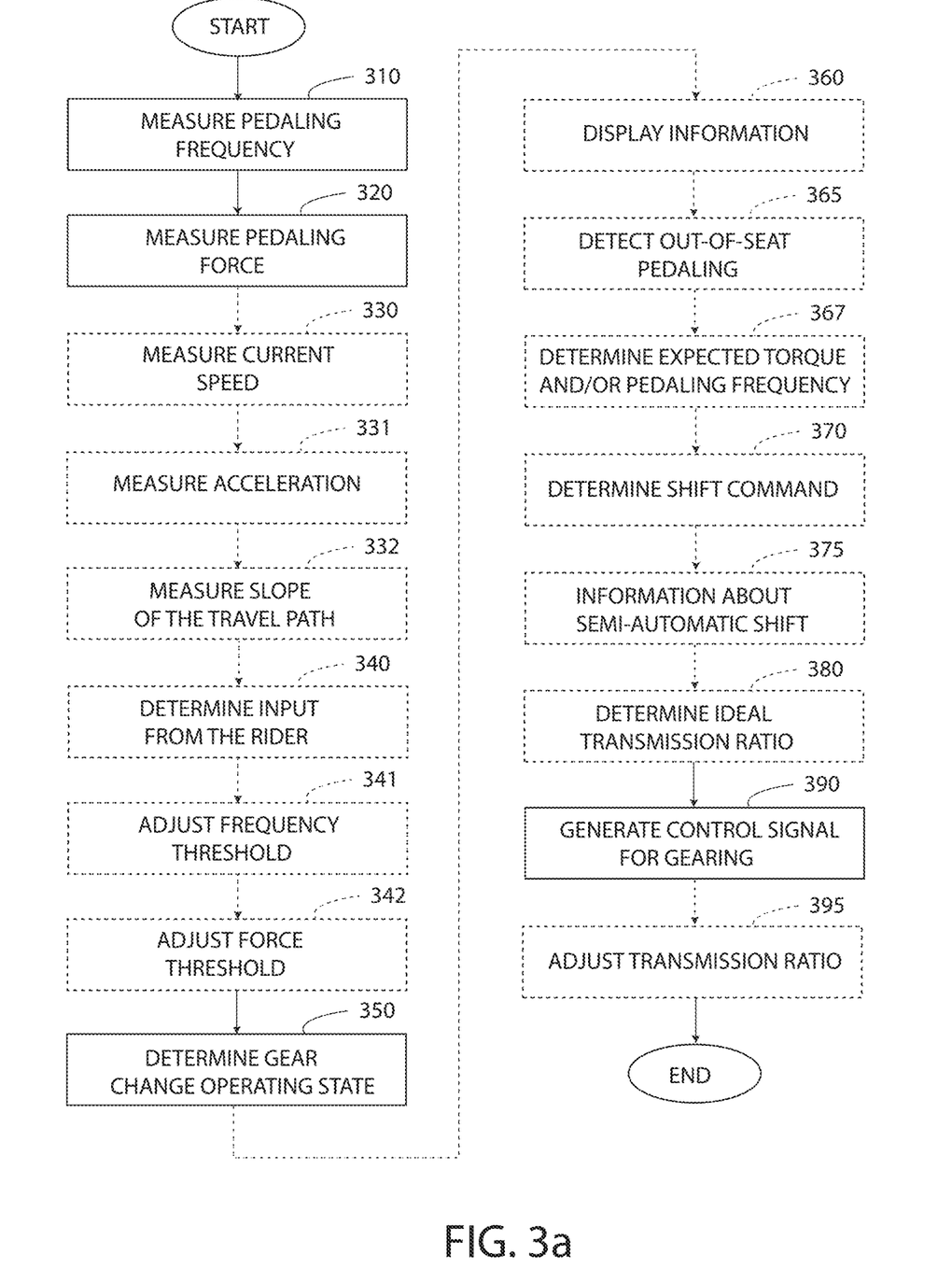
FIG. 3a: a process flow as a block diagram

FIG. 3a schematically shows a flowchart of the method as a block diagram. The method includes measuring 310 the bicycle rider's pedaling frequency K at the pedal shaft. The method also includes measuring 320 a bicycle rider's pedaling force F, whereby the pedaling force F is particularly measured as rider torque FM by means of the torque sensor 220. It can be provided that, optionally, a measurement 330 of a current speed v of the bicycle occur. Alternatively or additionally, optionally, in step 331, an acceleration of the bicycle in the longitudinal direction 190 can be measured. The measurement 331 of the acceleration is optionally performed as the determination of the acceleration of the bicycle in the longitudinal direction 190 on the basis of the measured speed v. Furthermore, in the optional step 332, a slope of the travel path of the bicycle 100, or a pitch angle of the bicycle 100 about the transverse axis of the bicycle 100, can be measured or determined by means of an inertial measurement unit 241 on the bicycle 100. In addition, in the optional step 340, a measurement of an input of the bicycle rider for setting a shift mode can occur. It can be provided that, in an optional step 341, a lower frequency threshold value and/or an upper frequency threshold value be adjusted on the basis of the bicycle rider's input measured in step 340. It can also be provided that, in an optional step 342, a lower force threshold value and/or an upper force threshold value be adjusted on the basis of the bicycle rider's input measured in step 340. Then, in step 350, a gear change operating state is determined on the basis of the measured pedaling frequency K and on the basis of the measured pedaling force F. The determination 350 of the gear change operating state occurs once the measured pedaling frequency K is less than or equal to the lower frequency threshold value, or the measured pedaling frequency K is greater than or equal to the upper frequency threshold value. Alternatively or additionally, the determination 350 of the gear change operating state occurs once the measured pedaling force F is less than or equal to the lower force threshold value, or the measured pedaling force F is greater than or equal to the upper force threshold value. Upon determining 350 the gear change operating state, acoustic, visual, and/or haptic information regarding the semi-automatic or predicted automatic shift is displayed to the bicycle rider in optional step 360. In an optional step 365, out-of-seat pedaling by the bicycle rider is detected or determined on the basis of the measured pedaling frequency and/or the measured pedaling force of the bicycle rider and/or a measured lateral acceleration of the bicycle 100 in the transverse direction of the bicycle 100 and/or a measured lateral inclination of the bicycle. For example, out-of-seat pedaling is detected when the measured pedaling frequency or measured rotational speed at the pedal shaft and/or the measured pedaling force is discrete peaks, and/or the measured lateral acceleration is greater than a lateral acceleration threshold value, and/or the measured lateral inclination repeatedly exceeds an out-of-seat pedaling angle to different sides of the bicycle within a specified out-of-seat pedaling period. In optional step 370, a determination of a shift command for the gearing is made. The optional determination 370 of the shift command is advantageously made on the basis of an expiration of a shift period after the determination of the gear change operating state, i.e., essentially, in particular, delayed in time, whereby the optional determination 370 of the shift command preferably does not occur when the measured pedaling frequency and/or measured pedaling force of the bicycle rider is again within the respective target ranges during the shift period. It can be provided that shift period be adjusted on the basis of the measured pedaling frequency and/or the measured pedaling force; for example, the shift period decreases linearly with increasing distance of the measured pedaling force from the lower or upper force threshold value. In other words, advantageously, in the optional step 370, the shift command is not determined if, during the shift period, the measured pedaling frequency K is again between the lower and upper frequency threshold values, and/or the measured pedaling force F is between the lower and upper force threshold values. In optional step 370, it can further be provided that the shift command be determined on the basis of the measured pedaling frequency and/or on the basis of the measured pedaling force. Advantageously, the optional determination 370 of the shift command is in this case made on the basis of a time change in the measured pedaling frequency and/or on the basis of a time change in the measured pedaling force. Moreover, it can be provided in optional step 370 that the shift command be determined or ascertained on the basis of the measured speed of the bicycle, the measured or determined acceleration, and/or the measured slope of the travel path or the pitch angle of the bicycle 100, whereby the shift command is in particular determined on the basis of at least one time change in the measured speed, the measured or determined acceleration, and/or the measured slope or pitch angle of the bicycle 100. For example, in optional step 370, it can be provided that the shift command be determined only when the speed of the bicycle exceeds a speed threshold value for the particular transmission ratio currently engaged. For example, it can also be provided in the optional step 370 that the shift command be determined only when the acceleration of the bicycle in the longitudinal direction exceeds a specified acceleration tolerance, whereby the acceleration tolerance is selected on the basis of the currently engaged transmission ratio or can be coupled to the currently engaged transmission ratio. In other words, in this optional embodiment, in step 370, a shift command is determined only if the amount of acceleration of the bicycle 100 exceeds the acceleration tolerance. In other words, optionally, the shift command is determined in step 370 only when the bicycle 100 is noticeably accelerated or slowed down for the rider. It can further be provided in step 370 that the shift command be determined immediately if the slope of the travel path or the pitch angle of the bicycle exceeds a slope threshold value; otherwise, for example, the shift command is determined on the basis of the shift period, or after it has elapsed. In an optional embodiment, it is provided that the shift command in the optional step 370 be additionally determined on the basis of the bicycle rider's measured input, whereby, preferably, the shift period is adjusted on the basis of the bicycle rider's measured input to the shift behavior or the shift mode. For example, the shift period is shortened if the bicycle rider desires a direct shift response through their measured input, or extended if the bicycle rider desires an indirect shift response through their measured input. Alternatively or additionally, in the optional step 370, the at least one speed threshold value or the acceleration tolerance of the bicycle or the slope threshold value of the travel path and/or threshold values for their time change can be adjusted on the basis of the measured input of the bicycle rider.

In one advantageous, optional further embodiment, in step 370, the shift command is additionally determined on the basis of an expected rider torque and/or an expected pedaling frequency, and on the basis of the current motor torque. Alternatively, it can be provided that the determination 370 of the shift command be made on the basis of a predicted future motor torque or on the basis of a predicted future motor power. For example, the transmission ratio adjustment is not performed when the predicted future motor torque and/or the predicted future motor power is reduced by more than a particular acceptance value. The optional determination 367 of the expected future rider torque and/or an expected pedaling frequency for the future transmission ratio—particularly for the ideal transmission ratio—is made on the basis of the measured current pedaling force of the bicycle rider and/or the measured current pedaling frequency and on the basis of the current motor power and on the basis of the current transmission ratio and the future transmission ratio. The current motor torque M or M1 is generated by a motor controller, e.g., according to Equation (5), and is thus known. Based upon the measured pedaling force F and the measured rider torque FM1, as well as the future transmission ratios i2 and the current transmission ratio i1 of the electrically controllable gearing 110, an estimate for the resulting rider torque FM2 can be made—for example, after determining the gear change operating state in step 350 for an upshift around a gear—taking into account the current motor torque M1, or an expected rider torque FM 2 can be determined; see Equation (6). For example, the current total torque is the sum of the measured current rider torque FM, FM1 and the current motor torque M or M1. Given knowledge of the current transmission ratios i1 and the future transmission ratios i2, the factor i2/i1 is known. Thus, according to Equation (6), if the determined expected rider torque FM2 exceeds a specified torque threshold value, for example, no shift command is advantageously determined in step 370 despite determining the gear change operating state in step 350—in particular, despite the expiration of a shift period—because the expected rider torque FM2 is deemed unacceptable for the bicycle rider. If the current motor torque corresponds to the maximum motor torque, in the event of an upshift, it can be assumed that the current motor torque M or M1 remains constant after the shift. In this saturation case in particular, the expected rider torque FM2 can become uncomfortably large for the rider after an upshift or an adjustment of the transmission ratio. If, alternatively, according to Equations (5) and (6), the determined expected rider torque FM2 falls below a respective acceptance value through a possible downshift, and thus also the predicted future motor torque M2 and/or the predicted future motor power PM, advantageously, despite determining the gear change operating state, in step 350—in particular, despite the lapse of a shift period—in step 370, no shift command is determined, because the predicted future motor torque M2 and/or the predicted future motor power PM is deemed unacceptable for the bicycle rider. This case can occur, in particular, when downshifting on a flat travel path at high speeds.

$$FM2 + M2 = FM2(1 + \alpha) = FM1 + M1 \cdot \frac{i_2}{i_1} \quad (6)$$

Preferably, the shift command is determined in the optional step 370 only if the expected rider torque FM2 is between the lower and upper force threshold values, and/or the expected pedaling frequency K is between the lower and upper frequency threshold values.

In addition, the optional determination 370 of the shift command is additionally performed on the basis of the detected out-of-seat pedaling, whereby in particular no shift command is determined after the shift period has elapsed in the event of detected out-of-seat pedaling, since an adjustment of a transmission ratio during the out-of-seat pedaling is generally perceived as unpleasant by a bicycle rider.

In the case of an optional semi-automatic shift, in a preferred further development, after determining 370 the shift command, in the optional step 375, there is acoustic, visual, and/or haptic shift information about the semi-automatic shift. In other words, in the optional step 375, the bicycle rider is asked to trigger the semi-automatic shift, advantageously, by changing the pedaling frequency or an input—for example, by means of the input means 140.

Furthermore, it can be provided that, in the optional step 380, a determination be made of an ideal transmission ratio on the basis of the measured pedaling frequency, the measured pedaling force, the measured speed of the bicycle, the measured or determined acceleration of the bicycle, and/or the measured slope of the travel path, whereby the gearing between the current transmission ratio and the ideal transmission ratio has at least one skipped transmission ratio of the gearing. For example, Equation (6) can be used to determine the ideal transmission ratio, whereby the ideal transmission ratio is the transmission ratio at which, for example, the determined expected rider torque FM2 is closest to a specified torque target value. It can be provided that the optional determination 380 of the ideal transmission ratio additionally be made on the basis of the measured input of the bicycle rider, the torque target value being, e.g., adjusted on the basis of the measured input.

In a subsequent step 390, a control signal for the gearing is generated on the basis of the determined gear change operating state and optionally on the basis of the particular shift command. The generation 390 of the control signal for the gearing is additionally performed on the basis of the determined ideal transmission ratio. In one advantageous embodiment, it can be provided that the generation 390 of the control signal for the gearing occur only if, after the particular shift command in step 370, the measured pedaling frequency of the bicycle rider is less than an activation frequency threshold value, in particular zero, and/or the measured pedaling force of the bicycle rider is less than an activation force threshold value, in particular zero, and/or a shift input of the bicycle rider by means of an input means is measured, whereby in each case a comfortable, optionally semi-automatic shift results. In the optional step 395, the adjustment 395 of the transmission ratio of the gearing is performed on the basis of the generated control signal. In other words, the method can end with step 390, i.e. generation 390 of the control signal for the gearing, when, e.g., only a drive unit or controller of a bicycle is considered.

Figure 3B:
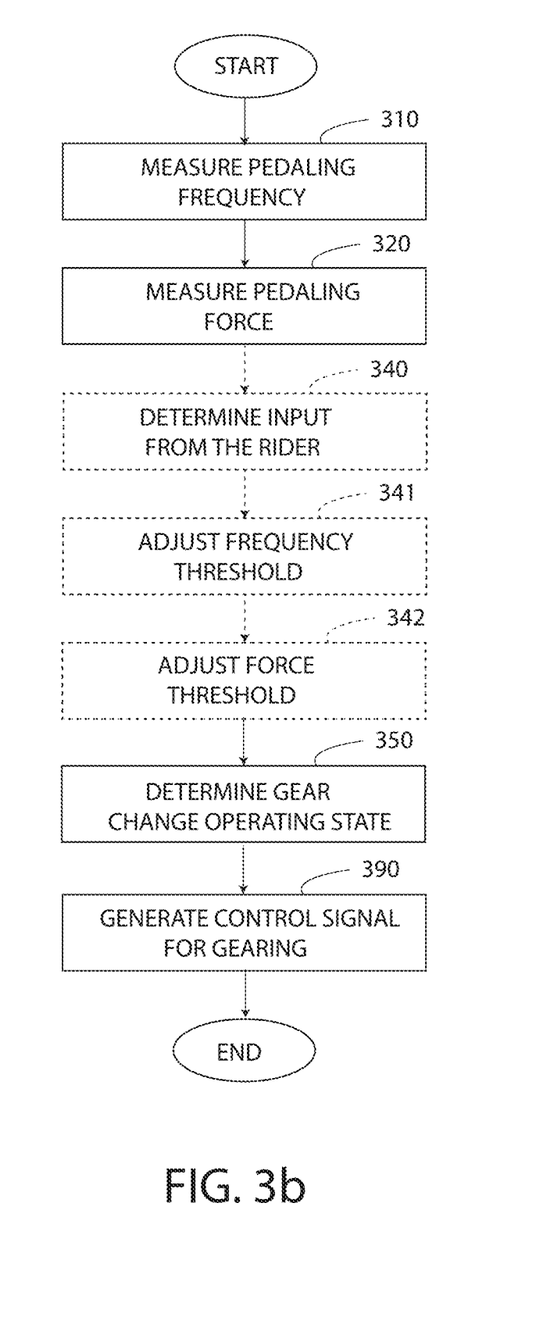
FIG. 3b: an alternative process flow as a block diagram

In FIG. 3b, an alternative, abbreviated method sequence is shown schematically as a block diagram. The alternative method in FIG. 3b includes a measurement 310 of the bicycle rider's pedaling frequency K at the pedal shaft. The method also includes a measurement 320 of a pedaling force F of the bicycle rider. In optional step 340, an input of the bicycle rider for setting a shift mode is measured. Then, in optional step 341, a lower frequency threshold value and/or an upper frequency threshold value is adjusted on the basis of the measured input of the bicycle rider. In the optional step 342, a lower force threshold value and/or an upper force threshold value is adjusted on the basis of the measured input of the bicycle rider. Then, in step 350, a gear change operating state is determined on the basis of the measured pedaling frequency K and on the basis of the measured pedaling force F, if the measured pedaling frequency K is less than or equal to the lower frequency threshold value, or the measured pedaling frequency K is greater than or equal to the upper frequency threshold value. Alternatively or additionally, the determination 350 of the gear change operating state occurs once the measured pedaling force F is less than or equal to the lower force threshold value, or the measured pedaling force F is greater than or equal to the upper force threshold value. After determining 350 the gear change operating state, a control signal for the gearing on the basis of the determined gear change operating state is, in the method in FIG. 3b, immediately generated. Thus, the method in FIG. 3b differs from the prior art by measuring 340 the bicycle rider's input and by adjusting 341 the lower and/or upper frequency threshold values and/or adjusting 342 the lower and/or upper force threshold values in each case on the basis of this measured input. This results in the advantage that the shifting behavior of a semi-automatic or automatic gearing is already comfortable and easily adjustable for the bicycle rider, or an indirect or direct shifting behavior can be easily adjusted according to the riding situation. This can be of particular interest in the area of mountain biking applications.

Figure 4:
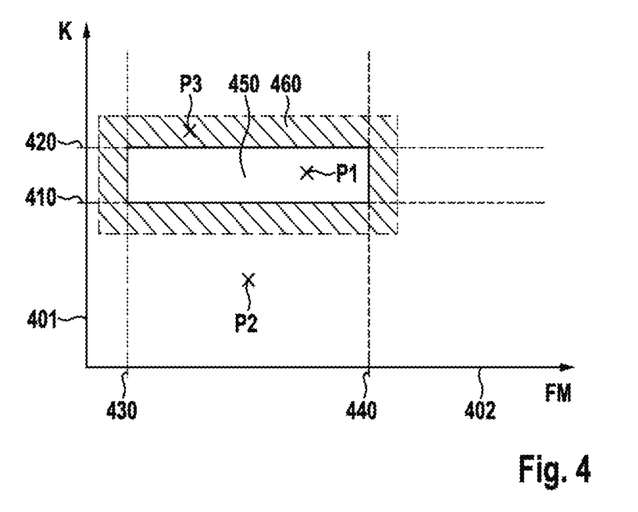
FIG. 4: a graph of a target range for the pedaling force and pedaling frequency

In FIG. 4a, a two-dimensional diagram of the target range 450 for shifting a transmission ratio is shown schematically. The abscissa 402 represents the rider torque FM. The abscissa 402 also represents by way of example the lower force threshold value 430 and upper force threshold value 440. The ordinates 401 represent the pedaling frequency K. Furthermore, on the ordinates 401, the lower frequency threshold value 410 and upper frequency threshold value 420 are shown by way of example. Between the lower force threshold value 430 and the upper force threshold value 440, as well as between the lower frequency threshold value 410 and the upper frequency threshold value 420, the target range 450 is defined, or is where the target range 450 lies. If the measured pedaling frequency K and the measured pedaling force F or the measured rider torque FM are within this target range 450, no gear change operating state is determined, e.g. at point P1. Once the measured pedaling frequency K and/or the measured pedaling force leave the limits of that target range 450, or the measured pedaling frequency falls below the lower frequency threshold value 430, or the measured pedaling frequency exceeds the upper frequency threshold value, and/or the measured pedaling force falls below the lower force threshold value, or the measured pedaling force exceeds the upper force threshold value, a gear change operating state is determined, e.g. at point P2. The lower frequency threshold value and/or the upper frequency threshold value and/or the lower force threshold value and/or the upper force threshold value are optionally adjusted by an input of the bicycle rider to the shift mode, thereby making the shift behavior more direct or indirect. In other words, the desired range 450 can be adjusted by measuring 340 the bicycle rider's input and method steps 341 and/or 342. A temporarily acceptable operating range 460 for the bicycle rider is shown in dashed lines around the target range 450 for the pedaling frequency K and for the pedaling force For the rider torque FM. If the measured pedaling frequency K and/or the measured pedaling force For the rider torque FM are in this temporarily acceptable operating range 460, no adjustment of the transmission ratio is, at least briefly, necessary. In the method, the gear change operating state is determined in step 350 if the measured pedaling frequency K and/or the measured pedaling force F or the rider torque FM is outside the target range, i.e., even if the measured pedaling frequency K and/or the measured pedaling force F or the rider torque FM are within the temporarily acceptable operating range 460—for example, at point P3. Preferably, after determining 350 the gear change operating state, e.g. at point 3, a control signal for the gearing is not generated immediately in step 390, but, rather, a lapse of the shift period for determining 370 a shift command for the gearing is awaited. For example, the measured pedaling frequency K and/or the measured pedaling force F or the rider torque FM can leave the limits of the target range 450 only for a short time and enter the target range 450 again during the end of the shift period. The generation 390 of the control signal for the gearing is thus advantageously performed additionally on the basis of the particular shift command or on the basis of the expiration of the shift period. By the method, an undesirable, frequent shifting back and forth between different transmission ratios can advantageously be avoided, since shifting of the gearing is advantageously delayed, in particular if the measured pedaling frequency K and the measured pedaling force F or the measured rider torque FM are within the temporarily acceptable operating range.

The invention claimed is:

1. A method for changing a transmission ratio of an electrically controllable gearing of a bicycle, comprising:
   measuring a pedaling frequency of a bicycle rider of the bicycle on a pedal shaft of the bicycle,
   measuring a pedaling force of the bicycle rider, and
   determining a gear change operating state based on the measured pedaling frequency and based on the measured pedaling force if:
      i. the measured pedaling frequency is:
         a. less than or equal to a lower frequency threshold value, or
         b. greater than or equal to an upper frequency threshold value, and/or
      ii. the measured pedaling force is:
         a. less than or equal to a lower force threshold value, or
         b. greater than or equal to an upper force threshold value,
   wherein, after the determining the gear change operating state, the method includes (i) generating a control signal for the gearing according to the determined gear change operating state, and (ii) determining a shift command for the gearing,
   wherein the generating the control signal for the gearing is additionally performed based on the determined shift command,
   wherein prior to the generating the control signal the method includes:
      determining an expected rider torque and/or an expected pedaling frequency for a future transmission ratio based on the measured pedaling force of the bicycle rider and/or the measured pedaling frequency and based on a current motor torque and based on the current transmission ratio and the future transmission ratio, and
      determining the shift command additionally based on the expected rider torque and/or the expected pedaling frequency, wherein, the shift command is determined only if the expected rider torque is between the lower and upper force threshold values, and/or the expected pedaling frequency is between the lower and upper frequency threshold values.

2. The method according to claim 1, wherein the determining the shift command is performed based on an expiration of a shift period following the determination of the gear change operating state.

3. The method according to claim 1, wherein the shift command is determined based on the measured pedaling frequency and/or the measured pedaling force.

4. The method according to claim 1, further comprising:
   measuring a speed of the bicycle, and/or
   measuring an acceleration of the bicycle, or determining the acceleration based on the measured speed, and/or
   measuring a slope of a travel path of the bicycle,
   wherein the determining the shift command is performed based on the measured speed of the bicycle, the measured or determined acceleration, and/or the measured slope.

5. The method according to claim 4, further comprising: determining an ideal transmission ratio based on the measured pedaling frequency, the measured pedaling force, the measured speed of the bicycle, the measured or determined acceleration of the bicycle, and/or the measured slope of the travel path,
   wherein the gearing between the current transmission ratio and the ideal transmission ratio features at least one skipped transmission ratio of the gearing, and
   wherein the generating the control signal for the gearing is additionally performed based on the determined ideal transmission ratio.

6. The method according to claim 1, further comprising:
   after the determining the gear change operating state, displaying an acoustic, visual, and/or haptic item of information regarding a predicted automatic shift for the bicycle rider.

7. The method according to claim 1, wherein generation of the control signal for the gearing occurs only if, after determination of the shift command:
   the measured pedaling frequency of the bicycle rider is less than an activation frequency threshold value, and/or
   the measured pedaling force of the bicycle rider is less than an activation force threshold value, and/or
   a shift input of the bicycle rider is measured by way of an input means, wherein, after determining the shift command, an acoustic, visual, and/or haptic item of shift information regarding a semi-automatic shift is displayed to the bicycle rider.

8. The method according to claim 1, wherein a computer program comprises commands that, when the computer program is executed by a computer, prompt the computer to perform the method.

9. A controller, comprising:
   a first signal input for providing a first signal representing the pedaling frequency of a bicycle rider,
   a second signal input for providing a second signal representing the pedaling force of the bicycle rider,
   a signal output for outputting a control signal for an electrically controllable gearing of a bicycle, and
   a computing unit configured such that the method according to claim 1 is performed.

10. The method according to claim 1, wherein the shift command is determined based on a time change in the measured pedaling frequency, and/or based on a time change in the measured pedaling force.

11. The method according to claim 1, wherein generation of the control signal for the gearing occurs only if, after determination of the shift command:
   the measured pedaling frequency of the bicycle rider is zero, and/or
   the measured pedaling force of the bicycle rider is zero, and/or
   a shift input of the bicycle rider is measured by way of an input means, wherein, after determining the shift command, an acoustic, visual, and/or haptic item of shift information regarding a semi-automatic shift is displayed to the bicycle rider.

12. A drive unit for an electric bicycle, comprising:
   a drive motor,
   a rotational speed sensor, wherein the rotational speed sensor is configured to measure a pedaling frequency of a bicycle rider on the pedal shaft of a bicycle,
   a pedaling force sensor, wherein the pedaling force sensor is configured to measure a pedaling force of a bicycle rider on the pedal shaft of a bicycle, and
   a controller according to claim 9.

13. A bicycle, comprising an electrically controllable gearing having a drive unit according to claim 12.

14. A method for changing a transmission ratio of an electrically controllable gearing of a bicycle comprising:
measuring a pedaling frequency of a bicycle rider of the bicycle on a pedal shaft of the bicycle,
measuring a pedaling force of the bicycle rider, and
determining a gear change operating state based on the measured pedaling frequency and based on the measured pedaling force if:
  i. the measured pedaling frequency is:
    a. less than or equal to a lower frequency threshold value, or
    b. greater than or equal to an upper frequency threshold value, and/or
  ii. the measured pedaling force is:
    a. less than or equal to a lower force threshold value, or
    b. greater than or equal to an upper force threshold value,
wherein, after the determining the gear change operating state, the method includes (i) generating a control signal for the gearing according to the determined gear change operating state, and (ii) determining a shift command for the gearing,
wherein the generating the control signal for the gearing is additionally performed based on the determined shift command,
the method further comprising:
  determining a predicted future motor torque and/or a predicted future motor power based on the measured pedaling force, and/or the measured pedaling frequency based on a current motor torque, and based on the basis of the current transmission ratio and a predicted future transmission ratio, and
  determining the shift command additionally based on the determined future motor torque or the predicted future motor power.

15. A method for changing a transmission ratio of an electrically controllable gearing of a bicycle, comprising:
measuring a pedaling frequency of a bicycle rider of the bicycle on a pedal shaft of the bicycle,
measuring a pedaling force of the bicycle rider, and
determining a gear change operating state based on the measured pedaling frequency and based on the measured pedaling force if:
  i. the measured pedaling frequency is:
    a. less than or equal to a lower frequency threshold value, or
    b. greater than or equal to an upper frequency threshold value, and/or
  ii. the measured pedaling force is:
    a. less than or equal to a lower force threshold value, or
    b. greater than or equal to an upper force threshold value,
wherein, after the determining the gear change operating state, the method includes (i) generating a control signal for the gearing according to the determined gear change operating state, and (ii) determining a shift command for the gearing,
wherein the generating the control signal for the gearing is additionally performed based on the determined shift command,
the method further comprising:
  detecting out-of-seat pedaling by the bicycle rider based on the measured pedaling frequency and/or the measured pedaling force of the bicycle rider and/or a measured lateral acceleration of the bicycle in a transverse direction of the bicycle and/or a measured lateral inclination of the bicycle, and
  determining the shift command additionally based on the detected out-of-seat pedaling, wherein, in a case of detected out-of-seat pedaling, no shift command is determined after an end of a shift period.

16. A method for changing a transmission ratio of an electrically controllable gearing of a bicycle, comprising:
measuring a pedaling frequency of a bicycle rider of the bicycle on a pedal shaft of the bicycle,
measuring a pedaling force of the bicycle rider, and
determining a gear change operating state based on the measured pedaling frequency and based on the measured pedaling force if:
  i. the measured pedaling frequency is:
    a. less than or equal to a lower frequency threshold value, or
    b. greater than or equal to an upper frequency threshold value, and/or
  ii. the measured pedaling force is:
    a. less than or equal to a lower force threshold value, or
    b. greater than or equal to an upper force threshold value,
wherein, after the determining the gear change operating state, the method includes generating a control signal for the gearing according to the determined gear change operating state,
the method further comprising:
  detecting an input of the bicycle rider to set a shift mode,
  adjusting the lower frequency threshold value and/or the upper frequency threshold value based on the detected input of the bicycle rider, and/or
  adjusting the lower force threshold value and/or the upper force threshold value based on the detected input of the bicycle rider, and/or
  determining a shift command for the gearing based on the detected input of the bicycle rider, wherein, based on the detected input of the bicycle rider, a shift period and/or respective tolerance ranges are adjusted to a current transmission ratio or respective threshold values for a speed of the bicycle, for an acceleration of the bicycle, for the pedaling force of the bicycle rider, for a slope of a travel path, and/or for a time change thereof, and/or
  determining an ideal transmission ratio additionally based on the detected input of the bicycle rider.

* * * * *